April 25, 1967  HIROSHI HIKOSAKA  3,315,370
CONTINUOUS DEHYDRATING APPARATUS
Filed March 26, 1965  4 Sheets-Sheet 2
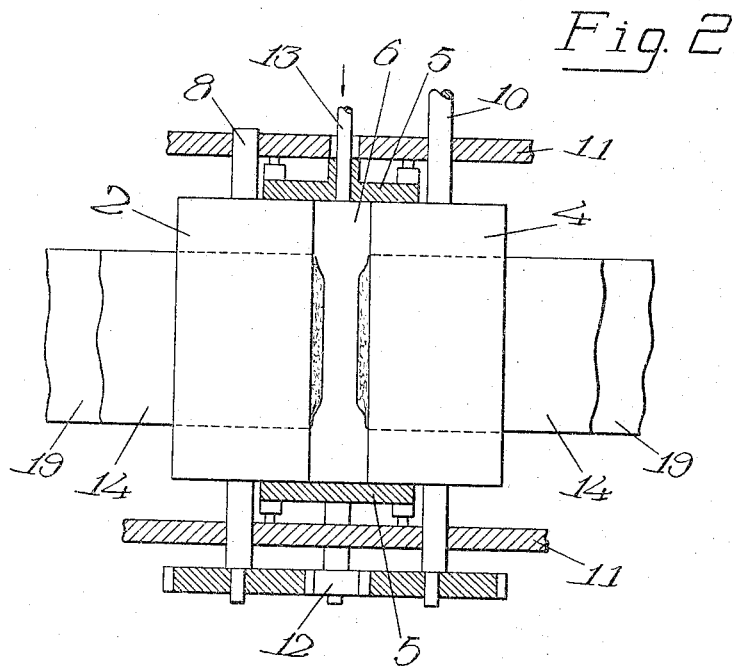
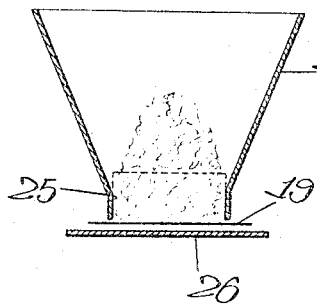
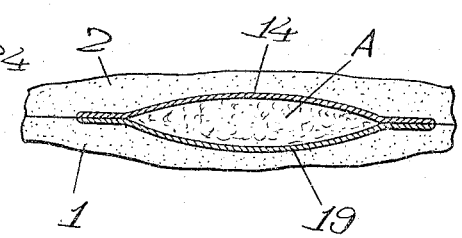
INVENTOR.
HIROSHI HIKOSAKA
BY *Kenwood Ross*
ATTORNEY.

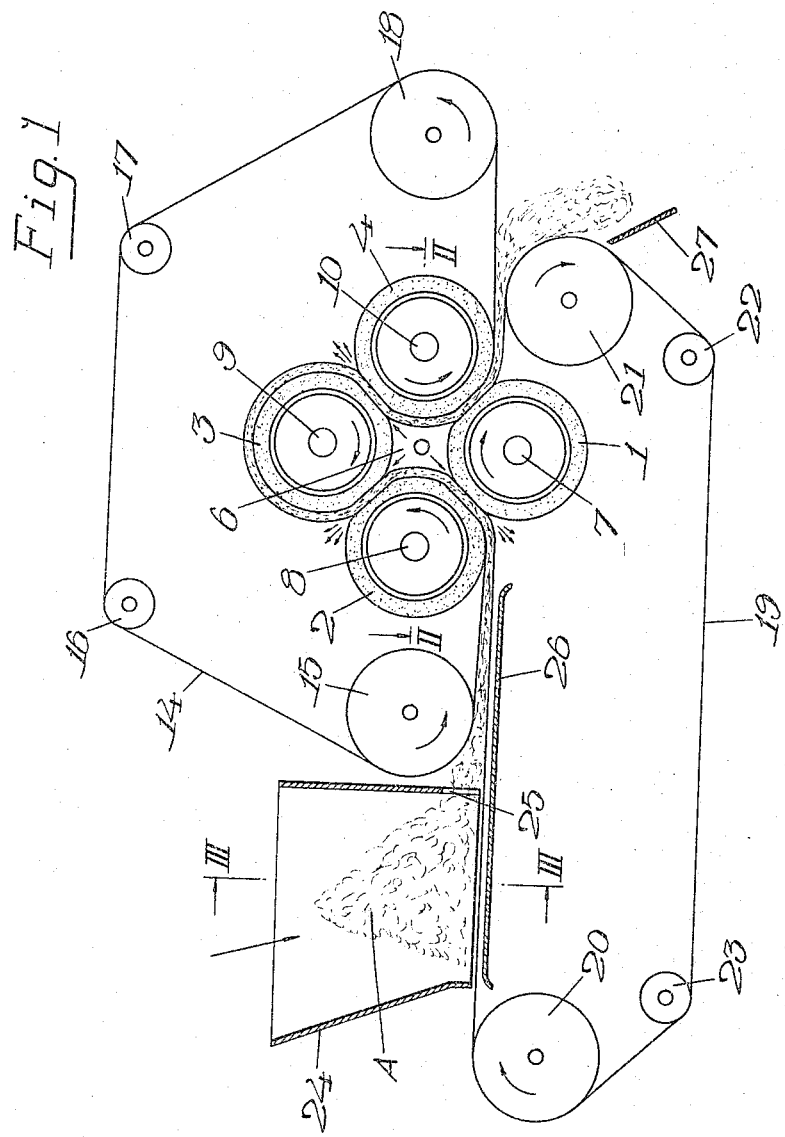

April 25, 1967

HIROSHI HIKOSAKA 3,315,370

CONTINUOUS DEHYDRATING APPARATUS

Filed March 26, 1965

INVENTOR.
HIROSHI HIKOSAKA
BY Kenwood Ross
ATTORNEY.

April 25, 1967 HIROSHI HIKOSAKA 3,315,370
CONTINUOUS DEHYDRATING APPARATUS
Filed March 26, 1965 4 Sheets-Sheet 4
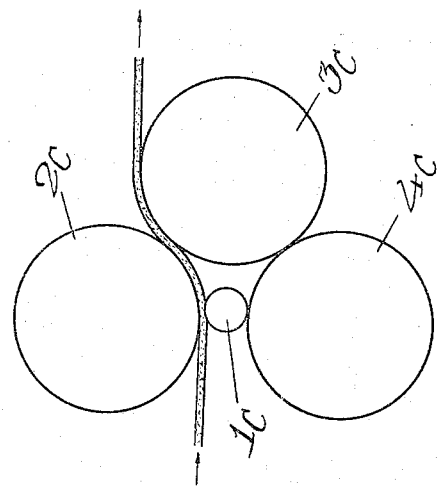
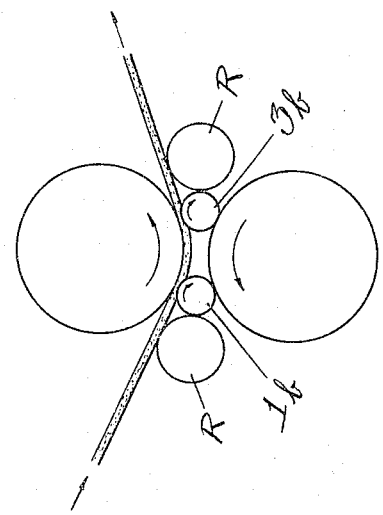
INVENTOR.
HIROSHI HIKOSAKA
BY Kenwood Ross
ATTORNEY.

United States Patent Office 3,315,370
Patented Apr. 25, 1967

3,315,370
CONTINUOUS DEHYDRATING APPARATUS
Hiroshi Hikosaka, 7 1-chome, Hatooka-cho, Kita-ku,
Nagoya-shi, Aichi-ken, Japan
Filed Mar. 26, 1965, Ser. No. 443,010
Claims priority, application Japan, May 6, 1964,
39/34,957
1 Claim. (Cl. 34—70)

The present invention relates to an apparatus for continuously dehydrating material such as loose wool and fibrous material held between air-permeable cloth belts or belt-like material or cloth such as top or tow (hereinafter referred to as cloth-like material).

Rubber rollers which have been used conventionally for dehydration did not effect a good dehydrating efficiency when the rubber was soft. When the rubber was hard the efficiency was good but hard to feed material to be dehydrated uniformly between the rollers. Dehydration at the edges of the rollers is rather strong due to folded part and this causes damages on the fibres. If the pressing force of the rubber coated roller is made large, the shaft of the rubber coated roller tends to bend so much as to cause uneven dehydration. In the vacuum suction system too, efficiency is rather wrong and in the centrifugal system it is not possible to secure continuous operation.

This invention is intended to remove such drawbacks and has for its object to provide an apparatus for continuously dehydrating material, having rollers capable to obtain a larger dehydrating efficiency than conventional ones.

Above and other objects and advantages of the present invention will be apparent from the following description with reference to the accompanying drawings, in which:

FIG. 1 is a vertical cross section in front view of an apparatus according to the present invention;

FIGS. 2 and 3 are views showing cross sections taken along the lines II—II and III—III in FIG. 1 respectively;

FIG. 4 is an enlarged cross section of a cloth belt held between rubber rollers in the apparatus;

FIGS. 5 to 7 are diagrammatic vertical sections of other embodiments of the present invention.

Figure 5:
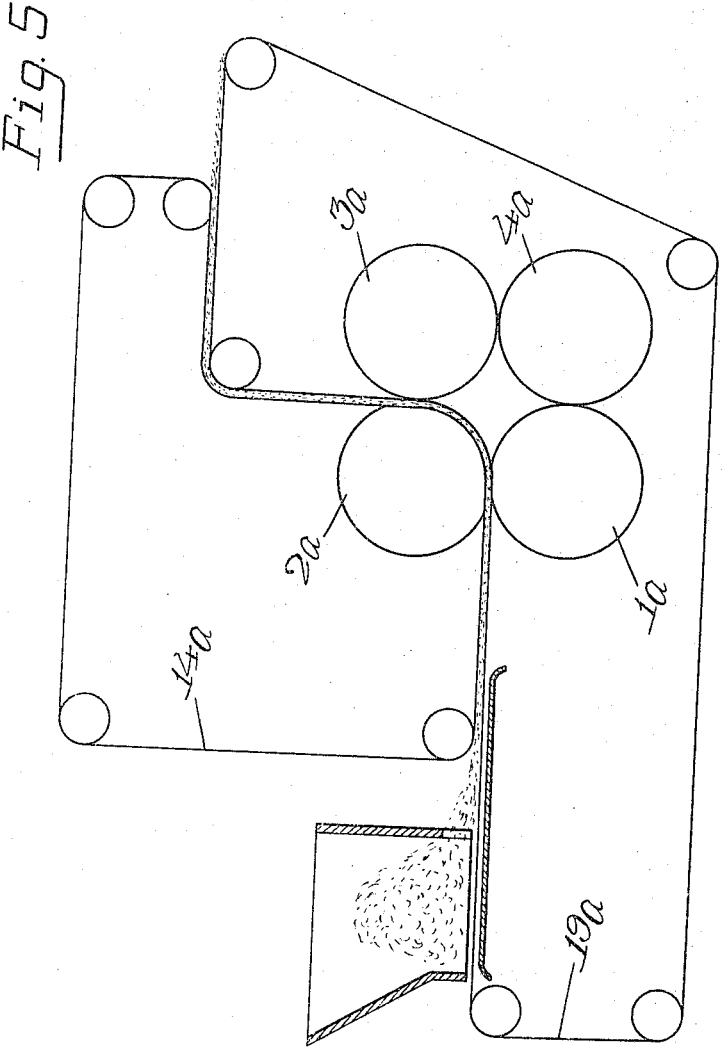

Now embodiments according to the present invention applied in a fibre dehydration apparatus for treating loose wool and the like will be described with reference to the drawings.

Referring to FIGS. 1 to 4 rubber rollers 1, 2, 3 and 4 of same periphery speed are arranged in parallel and in a ring-form and contacted with each other resiliently. Wall boards 5 (refer to FIG. 2) press against both end faces of each roller thereby forming an air-tight chamber 6 enclosed by the rubber rollers and the wall boards. Shafts 7, 8, 9 and 10 of the rollers 1, 2, 3 and 4 are mounted rotatably on a machine frame 11; gears 12 which cause the rollers to rotate in same periphery speed are fixed rigidly to the ends of the shafts, said gears being engaged with each other for driving the shafts that rotates the rollers in the arrow directions on FIG. 1 at the same periphery speed. Into the air-tight chamber 6 is fed compressed air flowing from the pipe 13. In the embodiment shown wall board 5 is held in the machine frame 11 and the outer peripheries and the end faces of the roller hubs are coated with rubber. 14 represents an air-permeable endless cloth belt wound around the guide rollers 15, 16, 17 and 18 supported on the machine frame 11. 19 is an air-permeable endless cloth belt wound around the guide rollers 20, 21, 22 and 23. The cloth belts 14 and 19 are wound around the rubber rollers 1, 2, 3 and 4 as shown in FIG. 1 and travel along with the rotation of the rubber rollers. On the left upper part of the cloth belt 19 is provided a hopper 24. The loose wool or fibre A that had been thrown into said hopper are fed from the hopper outlet 25 onto the cloth belt 19 continuously. The width of the hopper outlet 25 is made narrower than that of the cloth belt 19 as shown in FIG. 3 so as to prevent slipping of the fibres A out of the cloth belts. 26 is a guide plate to keep the underface of the cloth belt 19 securely and 27 is a guide plate provided on the right edge of the cloth belt 19.

According to the above-mentioned construction, the fibres A to be dehydrated which are fed on the cloth belt 19 from the hopper 24 are held between the cloth belts and transferred to the right side along with the travelling of the cloth belt. The fibres then fall down from the cloth belt after guided by the guide plate 27 on the right end of the cloth belt 19. While passing firstly between the rubber rollers 1 and 2 the cloth belt and the fibre travel through in a manner shown in the cross sectional view of FIG. 4. By squeezing action of the rollers 1 and 2 holding the belt and the fibres therebetween and by compressed air current splashing out from the air-tight chamber through the cloth belt and the fibres held between the rollers 1 and 2, the major part of the water contained in the fibres disperse in drops or mist as shown by arrow in FIG. 1 and the rest is removed in like manner while passing between the rollers 2, 3 and 3, 4. It sometimes occurs that part of the mist splashed between the rollers 3, 4 soak into the dehydrated fibre but when the material passes through the rollers 3 and 4 it is almost dehydrated, so that no trouble occurs in reality at all.

Illustration has hitherto been given with respect to the dehydration of fibre material held by cloth belts. With regard to the belt-like materials or cloth, these can be fed directly through between the rollers 1, 2 and drawn out from the rollers 4, 1 in like manner as in the former.

The rubber rollers applied in the above examples are limited in number to four units but these are not restricted in number for application. It may well be appreciated that any number of rubber rollers even more than four will similarly constitute an appropriate dehydrating apparatus.

In the above embodiment the material is held between the rollers and thereby dehydrated, therefore holding and dehydration at one place only will suffice the purpose. As shown in FIG. 5 four rollers 1a, 2a, 3a and 4a form air-tight chambers and holding of the cloth material is made only between the rollers 1a and 2a and also 2a and 3a, whereby formation of dehydrating and air-tight chambers is more efficient. 14a and 19a are cloth belts.

FIGS. 6 and 7 show other modifications according to this invention. It is well known that the smaller the diameter of a rubber roller the smaller is the contact surface of the roller and in consequence the better is the efficiency of dehydration. If the diameter of a roller is small, the roller would become difficult to resist against the inner pressure of the air-tight chamber and the force applied on the shaft when the fibres pass through the rollers. It is then possible to provide subsidiary rollers R as in FIG. 6 to form a dehydrator by use of small diameter rollers 1b and 3b. It is likewise possible to provide three large rollers 2c, 3c and 4c so as to make the small roller 1c strengthened by such large diameter rollers 2c and 4c so as to be able to provide much larger efficiency to the dehydrating apparatus.

Many variations may be effected without departing from the spirit of the invention. It is to be understood that these, together with other variations in details, are anticipated by the appended claim.

What I claim is:

A continuous dehydrating apparatus for ejecting and removing water contained in a cloth-like material, comprising, a frame, a plurality of rubber rollers arranged in ringlike axesparallel disposition and contacting each other for obtaining equal peripheral speeds, each said roller being adjacent to and in contact with an oppositely rotating roller, the opposite end faces of said rollers being arranged with cooperant wall boards for defining an air tight chamber circumscribed by said contacting rollers and the wall boards, each said roller being gear driven for effecting opposite rotation of adjacent rollers, said cloth-like material being entrained around adjacent rollers from one to another along the rotary directions of said rollers and delivered outwardly through the rollers and into the air tight chambers, a source of compressed air and conduit means for delivery of a charge of compressed air into the air-tight chamber and ejecting the air outside through the portion of the cloth material held between the rollers so as to remove the water from the cloth material.

References Cited by the Examiner

UNITED STATES PATENTS

| | | | |
|---|---|---|---|
| 347,360 | 8/1886 | Lorimer | 34—115 |
| 1,946,627 | 2/1934 | Karrer | 68—22 X |
| 2,289,753 | 7/1942 | Capstaff | 34—242 X |
| 2,693,879 | 11/1954 | Gehrman | 34—242 X |
| 2,944,291 | 7/1960 | Prior et al. | 34—16 X |
| 3,057,282 | 10/1962 | Luboshez | 68—22 X |

FOREIGN PATENTS 484,991   5/1938   Great Britain.

FREDERICK L. MATTESON, Jr., *Primary Examiner.*

A. D. HERMANN, *Assistant Examiner.*